Figure 1:
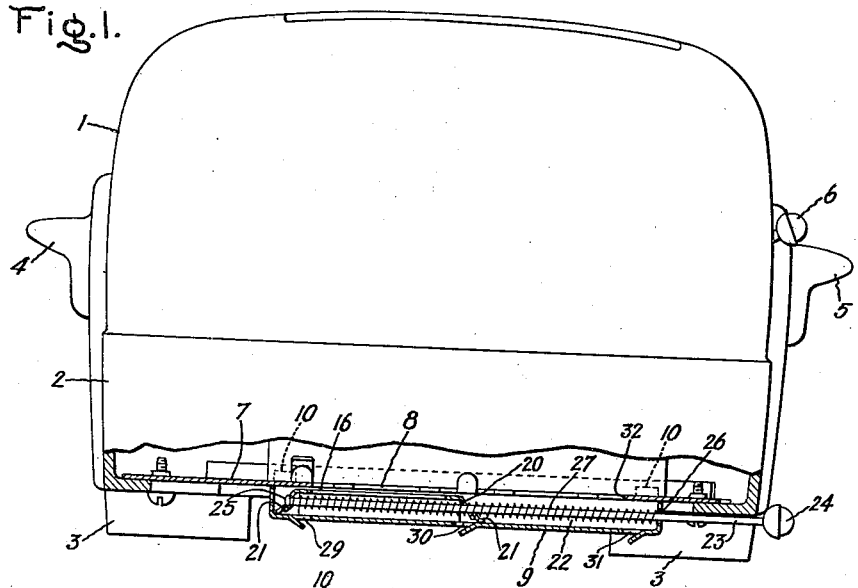

Jan. 10, 1950

A. M. YOUNG 2,494,373

CRUMB SCRAPER AND EJECTOR

Filed Jan. 27, 1948

Inventor:
Allan M. Young,
by Alfred E. Bobst,
His Attorney.

Patented Jan. 10, 1950

2,494,373

UNITED STATES PATENT OFFICE 2,494,373

CRUMB SCRAPER AND EJECTOR

Allan M. Young, Meriden, Conn., assignor to General Electric Company, a corporation of New York Application January 27, 1948, Serial No. 4,574

5 Claims. (Cl. 99—400)

My invention relates to toasters for bread and the like and has particular usefulness in domestic toasters of the automatic type, although obviously it may be applied to toasters of other types than the one here disclosed. The specific part of the toaster to which my invention is directed is that portion sometimes called the crumb tray or compartment.

Because of the dropping of particles from bread put into toasters and from toast taken out, crumbs accumulate in the bottom portion of most designs of toasters. If the toaster is made with an open bottom, the crumbs fall to the table or other surface on which the toaster rests, and this is untidy and annoying. Therefore, most toasters are made with a closed bottom or base which collects the crumbs. In automatic toasters, the piling up of crumbs may be particularly severe because of the friction of bread slices against internal surfaces of the toaster while the device goes through its automatic starting, stopping, and ejecting cycles.

One purpose of the present invention is to provide a means for ordinarily preventing undesirable accumulation of crumbs in a toaster, and a medium for readily removing crumbs should such accumulation unfortunately occur.

It is an object of the present invention to provide a convenient compartment or tray for crumbs accumulated during the operation of the toaster, the tray being designed for simplicity of cleaning. A further object is to provide, in a crumb tray for toasters, a device to loosen crumbs which stick thereon. A further object is to provide a mechanism for readily ejecting crumbs from a toaster crumb tray after they have been loosened.

Additionally, it is contemplated that the crumb-cleaning and crumb-ejecting mechanism shall be operable to clear the tray of crumbs without the need of moving or lifting the toaster from the table or other support upon which it rests.

The above objects, and others, are secured partly by providing a movable or removable crumb tray in the bottom of a toaster for major inspection, adjustment, or cleaning. This by itself is not my invention, but is covered by the patent to Harry W. Uhlrig No. 2,229,945, entitled "Crumb tray for electric toasters," which is assigned to the same assignee as the present application. I provide in such a tray as in the above patent, or in the permanent bottom of a toaster, a device for scraping crumbs from the inside wall of the tray or bottom. This scraper is made operable from outside the toaster. Additionally, the scraper may be designed to function as an ejector for crumbs after they have been loosened from the inner wall of the toaster bottom. When the tray is hinged or removable according to the Uhlrig patent, my device is most advantageously mounted on the crumb tray so that installation, inspection, adjustment, and cleaning of the scraper-ejector mechanism is facilitated.

Other objects and the details of that which I believe to be novel and my invention will become apparent from the following description and the claims appended thereto taken in conjunction with the accompanying drawings in which is illustrated an exemplary form of toaster embodying the present invention and incorporating a preferred form of scraper and crumb ejector.

Figure 2:
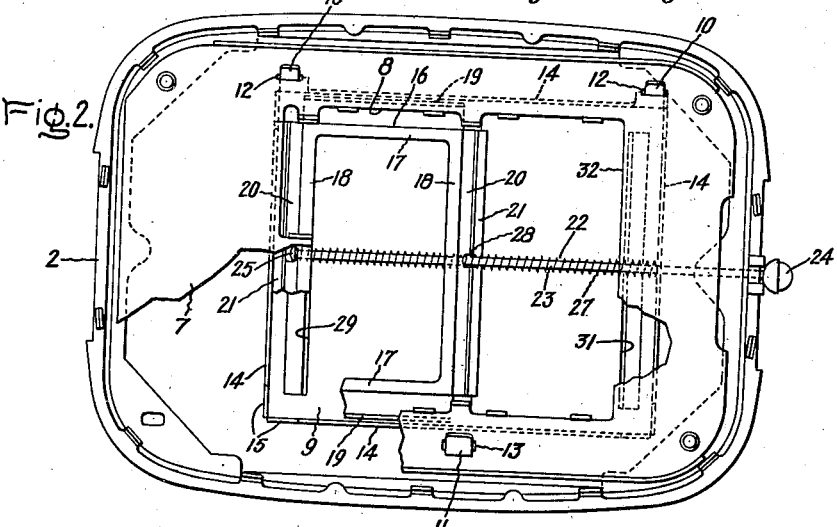
Figure 3:
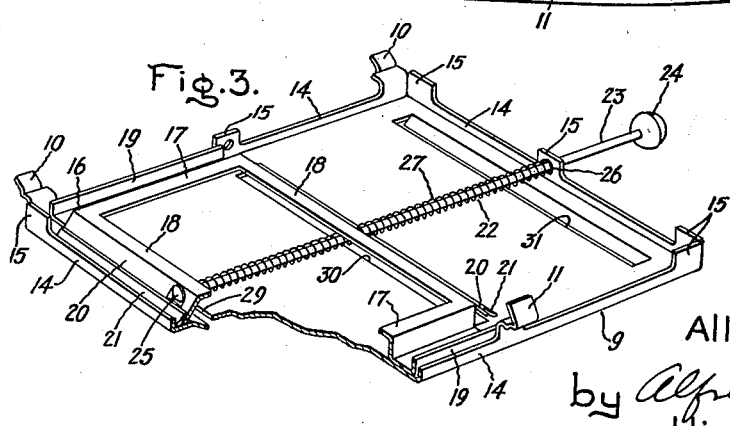

In the drawing, Fig. 1 is a side elevation and partial section of a toaster; Fig. 2 is a plan view of the base of the toaster of Fig. 1, certain parts being broken away for clarity; and Fig. 3 is a broken perspective of the crumb tray of Figs. 1 and 2.

The toaster shown in the drawings includes the usual toaster body 1 having a base 2 supported by legs 3 in spaced relation from a table or other conventional supporting surface (not shown). The usual handles 4, 5, and 6 are provided for lifting the toaster and for controlling the toasting operation as is well understood in the art. It is not necessary to describe further parts of the toaster in detail, since it is understood that details such as heating elements, toast racks or holders, and operating mechanism are mounted within the toaster body and supported on or above the base.

The base 2 is provided with a supporting surface 7 which has rectangular opening 8 therethrough which is located below and communicates with the usual toasting compartment so that crumbs from the material being toasted will drop through the opening.

Below the opening 8 is a generally rectangular crumb tray 9 constructed and arranged to cover the opening. This tray may be removably hinged to the underside of the supporting surface 7 on the base of the toaster body so that the tray may be removed without inverting the toaster or spilling loose crumbs which may be on the tray. The removable hinging may be accomplished through the medium of hinge lugs 10 and spring clip 11 on the tray which extend through openings 12, 12 and 13 in the maner taught by Patent 2,229,945. The tray may be additionally provided with side and end flanges 14 which carry projections 15 serving to space the edges of the tray from the supporting surface for ventilation. Thus far the device is no different from the one of the aforementioned prior patent.

Even though the tray may be readily removed for cleaning separately from the toaster, it sometimes happens that the accumulated crumbs will stick on the inner surfaces of the tray, making it difficult to remove them. In order to loosen these crumbs, a scraper is provided, which in the form shown takes the shape of a rectangular frame 16 having side pieces 17, 17 and cross pieces 18, 18. This scraper is slidably mounted in the tray and is guided in its movements through the engagement of flanges 19, 19 within the side flanges 14 of the tray.

Although I have shown the scraper in rectangular frame form because the crumb tray area to be cleaned is of rectangular form it is obvious that the scraper might take other shapes depending upon the shape of the crumb tray. For instance, if the crumb tray were circular, the scraper could also be circular or in the shape of a segment of a circle and be pivoted instead of sliding.

In the scraper shown, the cross pieces 18 are sloped downwardly as at 20 until their edges 21 contact the bottom of the crumb tray. These scraping edges may be provided, if desired, with felt, fabric, or other material to prevent screeching when the scraper is pulled across the metal bottom of the tray. Any desirable number of scraping edges may be provided.

To operate the scraper, a handle member 22 is provided, which is composed of a rod 23 and a knob 24. The rod is riveted or otherwise secured as at 25 to one of the cross pieces 18 of the scraper frame and passes slidably through an opening 26 in one of the projections 15 on the end of the crumb tray. As can be seen from Figs 1 and 2, the knob 24 extends outside of the area of the toaster so that it can be grasped without moving or otherwise disturbing the toaster proper.

In operation of the scraper, the knob is grasped and pulled outwardly, thus moving the scraper across the crumb tray and loosening any crumbs which may be stuck thereon. In order to return the scraper to its original position, a light compression spring 27 is slidably mounted around the rod 23 and extends between the outside cross piece of the scraper frame and the lug 15 on the edge of the crumb tray. A clearance hole 28 is provided for the rod and spring in the other cross piece of the scraper. Naturally, when the knob is released after pulling the scraper outwardly, the spring 27 will act to push the scraper back to its original position.

In addition to the scraping function, the frame 16 is designed to eject crumbs from the toaster bottom or crumb tray. In order to accomplish this, openings in the form of transverse slots 29, 30, and 31 are provided in the bottom of the crumb tray. When the scraper frame is in the position shown in the drawings, the slots 29 and 30 are covered by the cross pieces on the scraper, and the slot 31 is covered by the overhanging edge 32 of opening 8 in the supporting surface of the base. Therefore, in ordinary use of the toaster, crumbs will not fall through these slots.

However, when the knob is pulled to operate the scraper, the scraper edges 21 will push the loosened crumbs toward the openings 30 and 31 where they will drop by gravity through to the table or other support on which the toaster is placed.

In preparation for this, a napkin or piece of paper may be placed underneath the toaster before the scraper is operated, in order to collect the ejected crumbs. When the knob is released and the spring returns the scraper to its original position, crumbs which have not yet been ejected will be picked up by the scraper edges and ejected through the openings 29 and 30.

As should be obvious, the scraper and the slots may be provided in the solid bottom wall of a toaster which has no removable crumb tray. Mounting the scraper in a removable crumb tray, and providing the tray with slots has the advantage that the entire crumb-cleaning and disposal mechanism may be easily removed for major inspection, adjustment, cleaning, or even replacement. Furthermore, toasters already provided with removable crumb trays may have the benefits of my invention simply by replacing the original crumb tray with one having the scraper and slots.

It will be noted that the sloping faces 20 on the scraper cross pieces will prevent an undue accumulation of crumbs on these cross pieces. The sloping faces on the scraper cross pieces raise these and other portions of the scraper frame away from the bottom of the crumb tray. Because the cross pieces on the frame are spaced from the openings or slots in the tray, these slots serve as ventilation or draft openings. Thus, when the scraper-ejector is applied to an otherwise solid base toaster, the advantages in operation of a draft-supplied toaster are obtained. The same would be true where the scraper-ejector is applied to a toaster with a removable tray which normally does not have ventilation or draft openings.

As will be evident from the foregoing description, certain aspects of my invention are not limited to the particular details of construction of the example illustrated, and I contemplate that other and various modifications and applications of the invention will suggest themselves to one skilled in the art. It is my intention, therefore, that the appended claims shall cover such modifications and applications as do not depart from the true spirit and scope of my present invention.

What I claim as new and desire to secure by Letters Patent of the United States is:

1. In a toaster with a toasting compartment and a base with a supporting surface thereon having an opening therein communicating with the toasting compartment, a crumb tray removably supported below and covering said opening, a scraper movably mounted in the tray and movable thereacross to loosen crumbs, and said tray having a slot therein in the path of movement of the scraper so that loosened crumbs will be pushed through the slot by movement of the scraper.

2. In a toaster having a toasting compartment and a base below the compartment with a horizontal wall to collect crumbs from material toasted therein, a scraper movably mounted to slide in the base and slidable across the wall to loosen crumbs, said base wall having an opening therein across the path of movement of the scraper so that loosened crumbs will be pushed through the opening by the scraper, and a handle for slidably manipulating said scraper extending outside of the area covered by the toaster base.

3. In a toaster having a toasting compartment and a base below the compartment with a substantially rectangular surface to collect crumbs, a scraper with a rectangular frame slidably mounted for movement across the rectangular base surface to loosen crumbs, and said base surface having an elongated slot therein parallel to one side of the scraper frame and in the path of movement of that side of the scraper frame so that loosened crumbs will be pushed through the slot by movement of the scraper frame.

4. In a toaster having a toasting compartment and a base below the compartment with a horizontal surface to collect crumbs, a scraper movably mounted in the base, movable across the surface to loosen crumbs, said surface having an opening therein in the path of movement of the scraper so that loosened crumbs will be pushed through the opening by the scraper in one position of the scraper, and said scraper covering said opening in another position of the scraper so that crumbs will not normally drop through said opening.

5. As an article of manufacture, a crumb tray for a toaster adapted to be removably secured below the toasting compartment of the toaster and comprising a crumb-collecting surface having a crumb-disposal opening therein, a crumb scraper and ejector movably mounted on said surface of the tray for movement over the surface between positions where the scraper loosens crumbs from the surface and a position where the scraper ejects loosened crumbs through the opening, and a handle for manipulating the scraper and ejector.

ALLAN M. YOUNG.

REFERENCES CITED

The following references are of record in the file of this patent:

UNITED STATES PATENTS

| Number | Name | Date |
| --- | --- | --- |
| 767,648 | Korjibsky | Aug. 16, 1904 |
| 1,133,168 | Mitchell-Colson | Mar. 23, 1915 |
| 2,229,945 | Uhlrig | Jan. 28, 1941 |